(No Model.)  2 Sheets—Sheet 1.

S. D. GRATIAA.
PIPE THREADING AND CUTTING MACHINE.

No. 458,899. Patented Sept. 1, 1891.

WITNESSES
A. Bonville
Edward W. Farrell

INVENTOR
Simeon D. Gratiaa
by C. D. Moody
his atty (No Model.) 2 Sheets—Sheet 2.
S. D. GRATIAA.
PIPE THREADING AND CUTTING MACHINE.
No. 458,899. Patented Sept. 1, 1891.
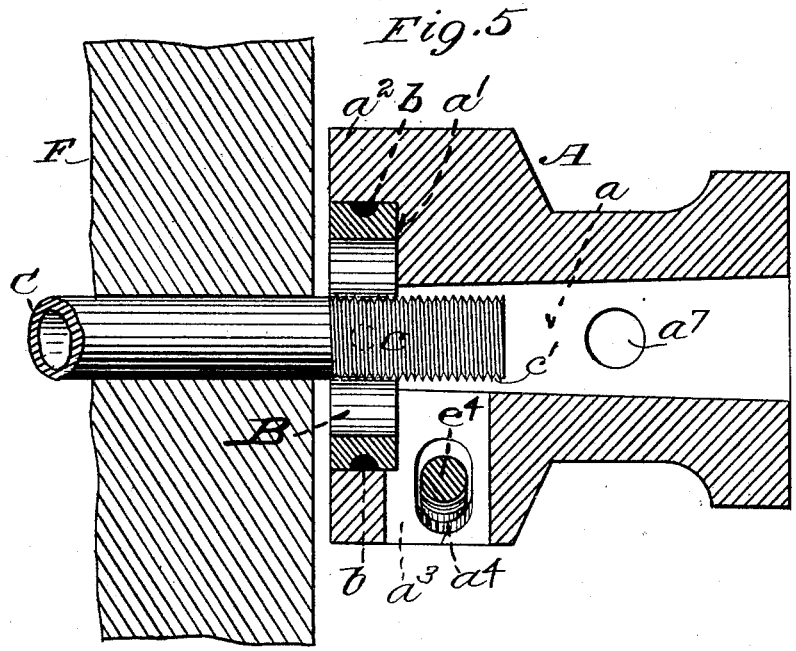
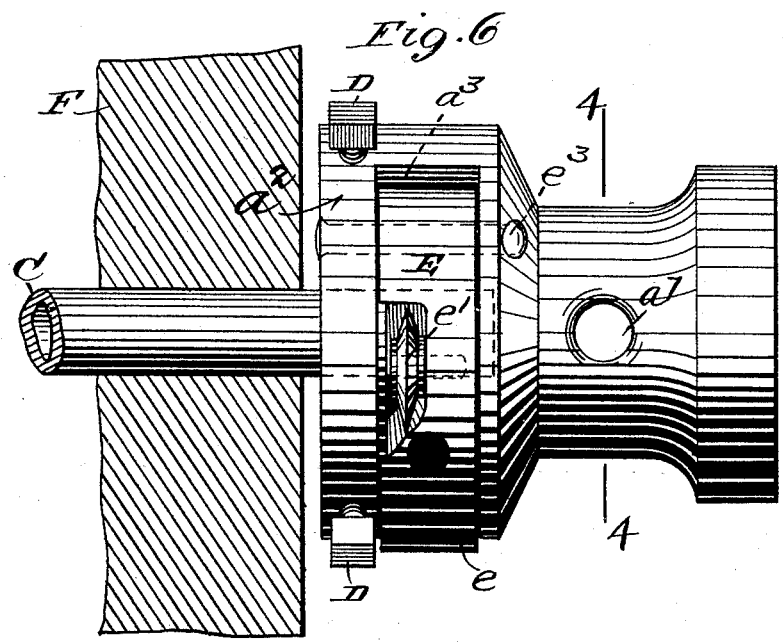
WITNESSES
A. Bonville
Edward W. Furrell
INVENTOR
Simeon D. Gratiaa
by C. D. Moody
his atty

UNITED STATES PATENT OFFICE.

SIMEON D. GRATIAA, OF ST. LOUIS, MISSOURI.

PIPE THREADING AND CUTTING MACHINE.

SPECIFICATION forming part of Letters Patent No. 458,899, dated September 1, 1891.

Application filed April 17, 1891. Serial No. 389,313. (No model.)

*To all whom it may concern:*

Be it known that I, SIMEON D. GRATIAA, of St. Louis, Missouri, have made a new and useful Improvement in Pipe Threading and Cutting Machines, of which the following is a full, clear, and exact description.

The present improved machine is adapted for both threading and cutting pipe. A single stock contains the threading mechanism and also the cutting mechanism. After the threading has been done the cutting mechanism is brought into use, and while the cutting is being performed the die which has been used in threading the pipe serves to center the machine properly upon the pipe to enable the cutting to be effected, and after completing the cutting operation the die is useful in removing any imperfection which may have been caused by the use of the cutting mechanism, all substantially as is hereinafter set forth and claimed, aided by the annexed drawings, making part of this specification, in which—

Figure 1:
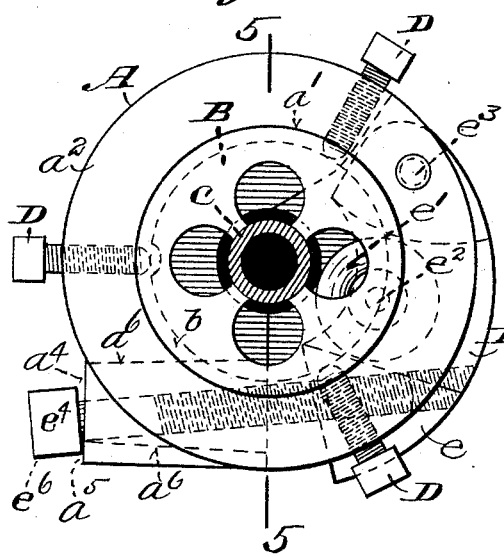
Figure 2:
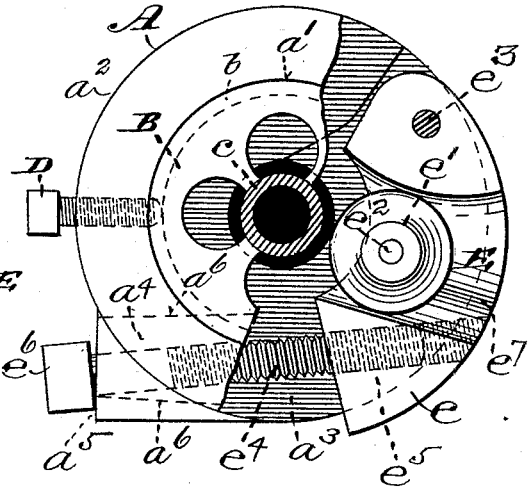
Figure 3:
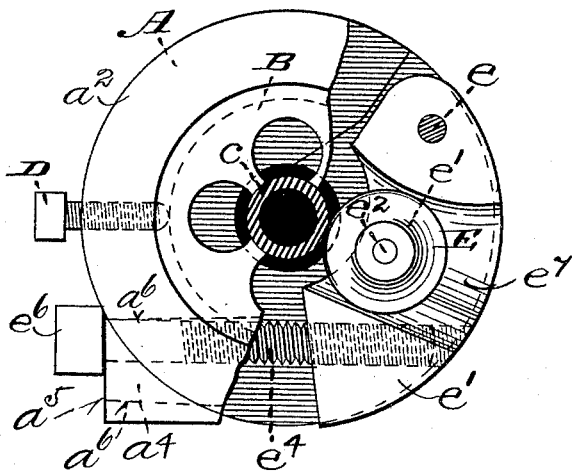
Figure 4:
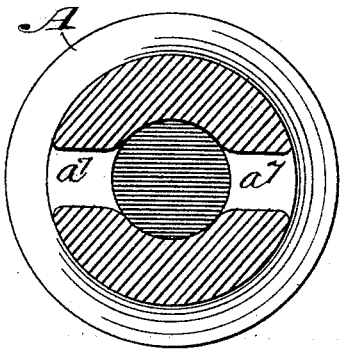

Figure 1 is an elevation of that end of the improved machine which is presented to the pipe to be operated upon. The parts are arranged as when the threading of the pipe, which is shown in section, is being effected. Fig. 2 is a view similar to that of Fig. 1, but showing a portion of the stock and of the die broken away to exhibit the cutting mechanism; Fig. 3, a view similar to that of Fig. 2, but showing the cutting mechanism adjusted for use; Fig. 4, a section on the line 4 4 of Fig. 6; Fig. 5, a longitudinal section on the line 5 5 of Fig. 1. The view includes the pipe being operated upon and the wall from which the pipe in the present instance projects, said pipe being shown in side elevation and said wall in section. Fig. 6 is a view analogous to that of Fig. 5, but showing the improved machine in side elevation.

The same letters of reference denote the same parts.

A represents the stock. B represents the die for cutting the thread upon the pipe. The stock is perforated longitudinally at its center in the ordinary manner to provide the chamber $a$ to receive the end $c$ of the pipe C. The die is circular at its periphery, and it is held in a seat $a'$ of corresponding shape in the end $a^2$ of the stock. The die can be held loosely in its seat, so that the stock can be rotated without carrying the die around with it, or the die can be fixed in the stock to be rotated as one part therewith.

The preferable means for fastening and loosening the die, as described, are the set-screws D D D, which are adapted to work radially in the stock and at their inner ends to engage in a groove $b$ in the peripheral portion of the die. When the screws are withdrawn, the die is loose in its seat; but the points of the screws may be allowed to project far enough into the die-groove to cause the die to be confined laterally in the stock and kept from being disengaged therefrom. When the screws are screwed inwardly, the die is tightened in the stock. The die is otherwise suitably constructed and in the customary manner to enable it when applied to and rotated upon the pipe to cut a thread thereon in the usual manner.

E represents the cutting mechanism of the machine. It consists substantially of an arm $e$, carrying a cutter $e'$, the arm being adjustable to enable the cutter to be withdrawn out of the way of the pipe during the threading operation and to be moved against the pipe when it is desired to cut it. The cutter is preferably a revolving one, being journaled at $e^2$ to the arm $e$, and the arm $e$ is pivoted in the stock A at $e^3$, and the stock is chambered out at $a^3$ to receive the cutting mechanism and enable it to be operated in the manner described. The preferable means for effecting the described adjustment of the cutting mechanism is the screw $e^4$, which is adapted to work through an opening $a^4$ in the stock and to engage with the threaded portion $e^5$ of the arm $e$. The head $e^6$ of the screw bears against the shoulder $a^5$ upon the stock, and the opening $a^4$ is suitably widened, substantially as indicated by the broken lines $a^6$ $a^6$, to provide for the change in the position of the screw as the arm $e$ is being adjusted. The arm $e$ is suitably chambered at $e^7$ to provide for the cutter. The stock is perforated at $a^7$ $a^7$ to receive a removable handle or lever (not shown) when it is desired to rotate the stock.

In operation the improved machine is applied to a pipe C, say, as indicated in Figs. 5 and 6. The die being fastened, as described, in its seat, the threading of the pipe is accomplished by rotating the stock in the proper direction upon the pipe. After the thread $c'$ has been formed upon the pipe to the desired extent thereon the die is loosened in its seat, so that the stock can be rotated around the pipe without carrying the die around with it. The cutting mechanism is then brought into use by suitably working the screw $e^4$ to cause the arm $e$ to be turned upon its pivot sufficiently for the cutter to bear suitably upon the pipe, substantially as is indicated in Fig. 3. The stock is then again rotated and in the same direction as in forming the thread upon the pipe, and as the cutter works into the pipe the screw $e^4$ is tightened more and more, and the operation proceeds until the cutting of the pipe is accomplished. Meanwhile the die has served to center the stock and enable it to be properly worked around the pipe until the cutting has been effected. The stock is now ready to be withdrawn from the pipe; but the die, by means of the screws D D D, is first tightened again in its seat to enable it to be unwound upon threaded pipe end. This being done, the stock is rotated backward upon the pipe until the die is free therefrom, and in doing this the die acts suitably upon the threaded pipe end to remove any projections thereon incident to the cutting operation and to leave the pipe end in shape for the attachment thereto of any part, such as a cap or any fixture, which may be subsequently applied to or connected with the pipe end.

F represents any wall or ceiling from which the pipe C projects.

The die B may be perforated or indented, as indicated at $b'$, Fig. 1, to receive a set-screw D, and thus provide for holding the die more firmly in the stock.

I claim—

1. The stock combining in its construction the pipe-threading and the pipe-cutting mechanisms, substantially as described.

2. The combination of the stock, the die adapted to be fastened and loosened, as described, and the adjustable cutting mechanism, substantially as described.

3. The combination of the stock, the die adapted to be fastened and loosened in the stock, as described, and the cutting mechanism consisting of the adjustable arm $e$, the cutter, and the screw $e^4$, substantially as described.

Witness my hand this 11th day of April, 1891.

SIMEON D. GRATIAA.

Witnesses:
C. D. MOODY,
J. W. COLLINS,
F. J. WATTS.